United States Patent [19]

Saito

[11] Patent Number: 5,500,949
[45] Date of Patent: Mar. 19, 1996

[54] MICROPROCESSOR SYSTEM FOR INHIBITING ACCESS TO MEMORY BY CHECKING SPECIFIC ADDRESS AND SPECIFIC CODES

[75] Inventor: Yasuo Saito, Yokohama, Japan

[73] Assignee: Kabushiki Kaisha Toshiba, Kawasaki, Japan

[21] Appl. No.: 237,416

[22] Filed: May 3, 1994

Related U.S. Application Data

[63] Continuation of Ser. No. 676,110, Mar. 27, 1991, abandoned.

[30] Foreign Application Priority Data

Mar. 27, 1990 [JP] Japan .......................... 2-77447

[51] Int. Cl.⁶ .............................. G06F 12/00; G06F 12/14
[52] U.S. Cl. .................... 395/427; 395/180; 365/195; 380/4; 364/969.1; 364/969.2; 364/969.4; 364/DIG. 2; 364/246.6; 364/246.7; 364/246.8
[58] Field of Search ...................... 395/375, 425, 395/400, 700, 800, 575, 425, 400, 375; 365/195; 380/4; 364/DIG. 1, DIG. 2

[56] References Cited

U.S. PATENT DOCUMENTS

| | | | |
|---|---|---|---|
| 3,659,275 | 4/1972 | Marshall | 395/575 |
| 3,827,029 | 6/1974 | Schlotterer et al. | 395/425 |
| 4,087,856 | 5/1978 | Attanasio | 395/700 |
| 4,118,789 | 10/1978 | Casto et al. | 364/900 |
| 4,434,464 | 2/1984 | Suzuki et al. | 395/425 |
| 4,584,665 | 4/1986 | Vrielink | 395/575 |
| 4,590,552 | 5/1986 | Guttag et al. | 395/425 |
| 4,628,479 | 12/1986 | Borg et al. | 395/425 |
| 4,646,234 | 2/1987 | Tolman et al. | 380/4 |
| 4,654,847 | 3/1987 | Dutton | 371/10.1 |
| 4,685,056 | 8/1987 | Barnsdale, Jr. et al. | 395/425 |
| 4,930,129 | 5/1990 | Takahira | 371/40.4 |
| 4,931,993 | 6/1990 | Urushima | 365/189.01 |
| 5,014,191 | 5/1991 | Padgaonkar et al. | 395/425 |
| 5,022,077 | 6/1991 | Bealkowski et al. | 380/4 |
| 5,056,009 | 10/1991 | Mizuta | 395/425 |
| 5,097,445 | 3/1992 | Yamauchi | 365/195 |
| 5,134,700 | 7/1992 | Eyer et al. | 395/425 |
| 5,189,610 | 2/1993 | Kaplan et al. | 364/419.11 |

FOREIGN PATENT DOCUMENTS

| | | |
|---|---|---|
| 0109504 | 5/1984 | European Pat. Off. |
| 0331407 | 9/1989 | European Pat. Off. |

*Primary Examiner*—Meng-Al An
*Attorney, Agent, or Firm*—Foley & Lardner

[57] ABSTRACT

A technique for preventing unauthorized operations in a microprocessor system provided for inhibiting access to a memory by checking specific addresses and codes, includes storing main programs and predetermined specific codes in a first memory, the execution of the specific codes by a user being prohibited; storing user programs in a second memory; respectively writing and reading the main and user programs to and from the first and second memories with a CPU; receiving address information over an address bus into a first check circuit, connected between the CPU and the first and second memories; activating a first check signal in the first check circuit to inhibit access to the first memory when an access instruction to a predetermined prohibited address is supplied by the CPU; receiving data information including instruction codes over a data bus into a second check circuit, connected between the CPU and the first and second memories; activating a second check signal in the second check circuit when instruction codes of the user program are the specific codes; receiving the first and second check signals into an inhibit circuit; and inhibiting access to the first and second memories according to the first and second check signals.

3 Claims, 6 Drawing Sheets

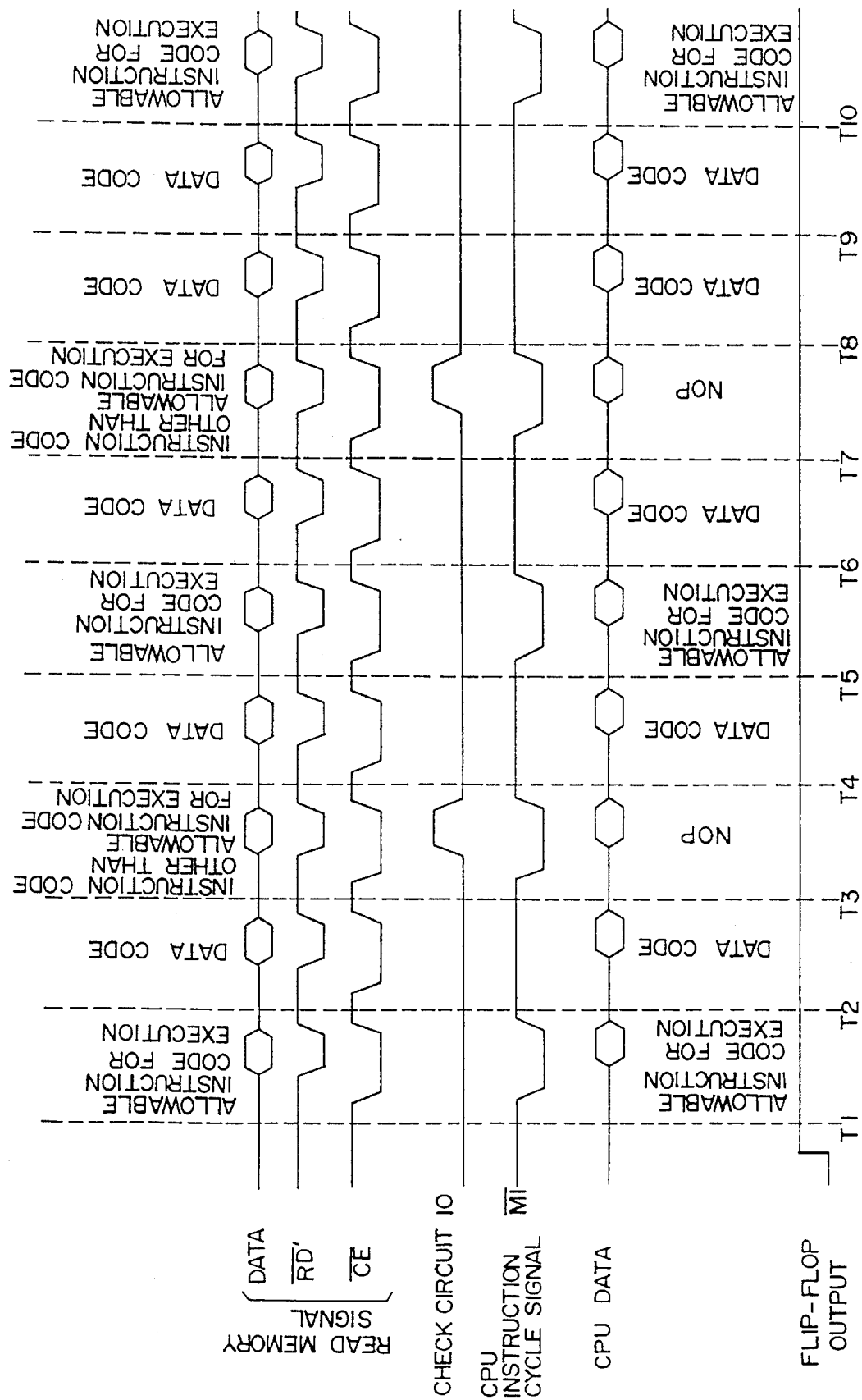

MICROPROCESSOR SYSTEM FOR INHIBITING ACCESS TO MEMORY BY CHECKING SPECIFIC ADDRESS AND SPECIFIC CODES

This application is a continuation of application Ser. No. 07/676,110, filed Mar. 27, 1991, now abandoned.

BACKGROUND OF THE INVENTION

This invention relates to a user programmable micro controller and more particularly to micro controllers used in devices requiring security such as IC cards and data banks.

In the conventional user programmable micro controllers, memory regions for programs such as the OS program installed when the micro controller was manufactured, and user programmable memory regions for programs made by the user after the micro controller was manufactured are separately provided.

However, because the program code made by the user is not checked, there is a possibility that programs and/or data in memory regions other than the user programmable memory regions could be damaged, read out or altered.

SUMMARY OF THE INVENTION

The object of this invention is to provide a micro controller which prevents, as much as possible, damage or altering of programs and data.

According to the present invention there is provided a micro controller comprising a first memory in which the main programs installed during manufacture are stored, a second memory in which user programs made by the user after manufacture are stored, a CPU which controls writing programs to and reading programs from the first and second memories and means for checking the code of the user program to see if it is suitable when it writes programs to and when it reads stored programs from the second memory to reject unsuitable program code.

Using the micro controller of this invention, the program code of the user program is checked to see if it is suitable or not when the CPU reads and writes the user program. Unsuitable program code is rejected. By so doing the micro controller of this invention can prevent damage, read out or altering of programs and data.

BRIEF DESCRIPTION OF THE DRAWINGS

FIGS. 3, 4, 5 and 6 are timing charts that describe the function of an embodiment of the micro controller of this invention.

DESCRIPTION OF THE PREFERRED EMBODIMENT

Figure 1:
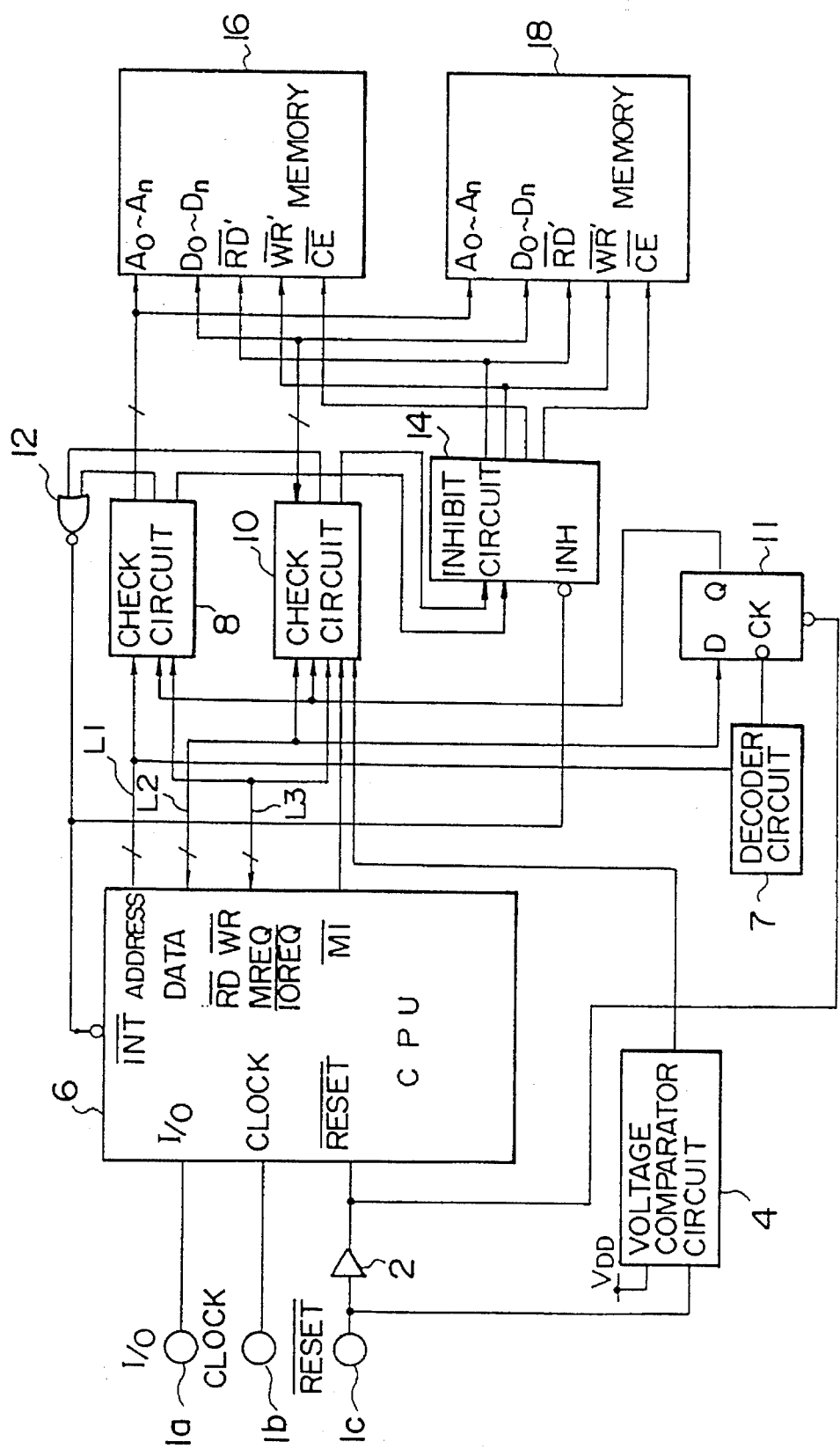
FIG. 1 is a block diagram of one embodiment of the construction of this invention.

FIG. 1 shows the construction of one embodiment of the micro controller of this invention. The micro controller of this embodiment has two memories, 16 and 18 that are accessed by the CPU 6. I/O terminal 1a, CLOCK terminal 1b, RESET terminal 1c are input terminals of this controller and are all connected to corresponding terminals on CPU 6. Between the RESET input terminal 1b and the RESET terminal of the CPU 6, a buffer 2 is provided. An address check circuit 8 is located along the address bus L1 which designates the addresses corresponding to the memories 16 and 18. A program check circuit 10 which checks the program code is located along the data bus L2 which transfers the data to the memories 16 and 18. The output of the check circuit 8 is sent to an input terminal on one side of the NOR gate 12 and to the inhibit circuit 14 and the output of the check circuit 10 is sent to the input terminal on the other side of the NOR gate 12 and to the inhibit circuit 14. The output of the inhibit circuit 14 is input to the terminals $\overline{RD}'$, $\overline{WR}'$ and $\overline{CE}$ of the memories 16 and 18 The output of the NOR gate 12 is input to the inhibit terminal $\overline{INH}$ of the inhibit circuit 14 and to the $\overline{INT}$ terminal of the CPU 6. The $\overline{RESET}$ input signal is compared to the reference voltage VDD by the voltage comparator circuit 4 and the output is sent to the check circuit 10. The output from the buffer 2 is sent to the reset terminal of the flip-flop 11. The address bus L1 passes through the decoder circuit 7 and is connected to the clock terminal of the flip-flop 11. The data bus L2 is connected to the input terminal D of the flip-flop 11. The Q output of the flip-flop 11 is sent to the check circuits 8 and 10.

In the memory 16, besides the main program that drives the micro controller, is stored the high security data which is necessary for preventing the user to damage, read out or alter any program code. This is necessary for increasing security. In the pre-designated user program region of the memory 18 the user programs and data created by the user are stored. The rest of the memory 18 is used as a data region.

The buffer 2 allows the RESET signal input from the RESET terminal 1c to pass if it is below the set value (for example 5 V), however, if the signal exceeds the set value, the excess is cut off and then output. The voltage comparator circuit 4 compares the value of the RESET signal with that of the voltage $V_{DD}$ from the power supply and outputs the result to the check circuit 10. The decoder circuit 7 sends a trigger signal that triggers the flip-flop circuit 11 when a specific address signal is sent from the CPU 6 along the address bus L1 just before execution of the user program. The flip-flop circuit 11 outputs a user program execute flag to the check circuits 8 and 10 based on the trigger signal from the decoder 7 and the data sent from the CPU 6 along the data bus L2. This user program execute flag is set to "1" during execution of a user program and is reset to "0" during execution of the basic main program in the memory 16.

The address location in the memory 16 of the necessary data needed to prevent decoding and altering code when the user accesses a program is set in the check circuit 8. When access to this address location is attempted by the CPU 6 an inhibit signal is sent to the NOR circuit 12 and the inhibit circuit 14 by the check circuit 8 when the user program execution flag is "1" and access is denied. If the user program execution flag is "0" then access is allowed.

The check circuit 10 has a feature that detects whether or not the data written to the memories 16 and 18 from the CPU 6 is designated instruction data. If the written data is not designated instruction data, a signal preventing loading is sent to the NOR circuit 12 and the inhibit circuit 14. Also the check circuit 10 has a function that detects whether or not the program data read from the memories 16 and 18 during execution of the user program is allowable execution instruction by comparing it with the instruction cycle state monitor signal M1 sent from the CPU 6. If it is not an allowable execution instruction then a signal for preventing execution is sent to the NOR circuit 12 and the inhibit circuit 14.

The inhibit circuit 14 inhibits access to the memories 16 and 18 by controlling the control signals, for example, signals $\overline{CE}$, $\overline{RD}'$ and $\overline{WR}'$, sent from the check circuits 8 and 10.

FIGS. 2 through 6 describe the function of the above example. When the CLOCK and the RESET of the micro controller in this embodiment receive input from the CLOCK terminal 1b and the RESET terminal 1c the flip-flop circuit 11 is reset by way of the buffer 2 (see steps F21, F22 and F23 of FIG. 2). Next the basic main program in the memory 16 is executed. After the internal status of the micro controller is set-up during the first part of execution of this main program, a program which selects several menus is executed (see step F24 of FIG. 2). Some of the programs that are selected are the main program execution menu, the user program load routine and the user program execution routine. The menu items are executed by inputting the designated signal by way of the I/O terminal 1a (see steps F25, F26 and F41).

The user program load routine and the user program execution routine will now be explained.

When the user program load routine is selected (step F26) the program load flag stored in the memory 16, that is the load flag showing whether or not it is permitted to load the user program into the memory 18, is checked by the CPU 6 as to whether it is "1" or "0" (step F27). If it is "0" it is permitted to load the user program, the user instruction code and the data code are then input through the input I/O terminal 1a (step F28) and sent to the check circuit 10 from the CPU 6 along the data bus L2. If the load flag is "1" the user program is already in the memory 18 and so the user program cannot be loaded and an error process is executed (step F34). As shown in the timing chart of FIG. 3, when data is input corresponding to instruction code, the voltage applied to the $\overline{RESET}$ terminal 1c is higher (for example 10 V) than the power supply voltage $V_{DD}$ (for example 5 V). The voltage applied to the $\overline{RESET}$ terminal 1c is compared to the power supply voltage by the voltage comparator circuit 4. The check circuit 10 determines whether the loaded data is instruction code or data code based on the comparison result.

When the data is sent along the data bus L2 from the CPU 6 the data is checked by the check circuit 10 to see whether it is instruction code or not. At the same time, if the data is instruction code it is also checked as to whether or not it is designated instruction code that the user is allowed to use (see steps F29 and F30 of FIG. 2). If the data is designated instruction code or data code, it is sent from the check circuit 10 and loaded and saved in the user program region of the memory 18 (see step F31 of FIG. 2 and see FIG. 4). If the data is instruction code other than designated instruction code a signal preventing loading of the data is sent to the NOR circuit 12 and the inhibit circuit 14 from the check circuit 10. Writing to the user program region of the memory 18 is prevented by the inhibit circuit 14 (see intervals T3–T4 and T8–T9 of FIG. 4) and an interrupt signal is sent to the CPU 6 by way of the NOR circuit 12 and an error process is executed (see steps F34 and F35 of FIG. 2). When writing the user program to the user program region of the memory 18 is completed, the program load flag is set to "1" (see steps F32 and F33 of FIG. 2) and rewriting the user program is prevented. If the memory 16 is a nonvolatile memory, the program load flag will maintain the same value even if the power supply is turned off.

Figure 2:
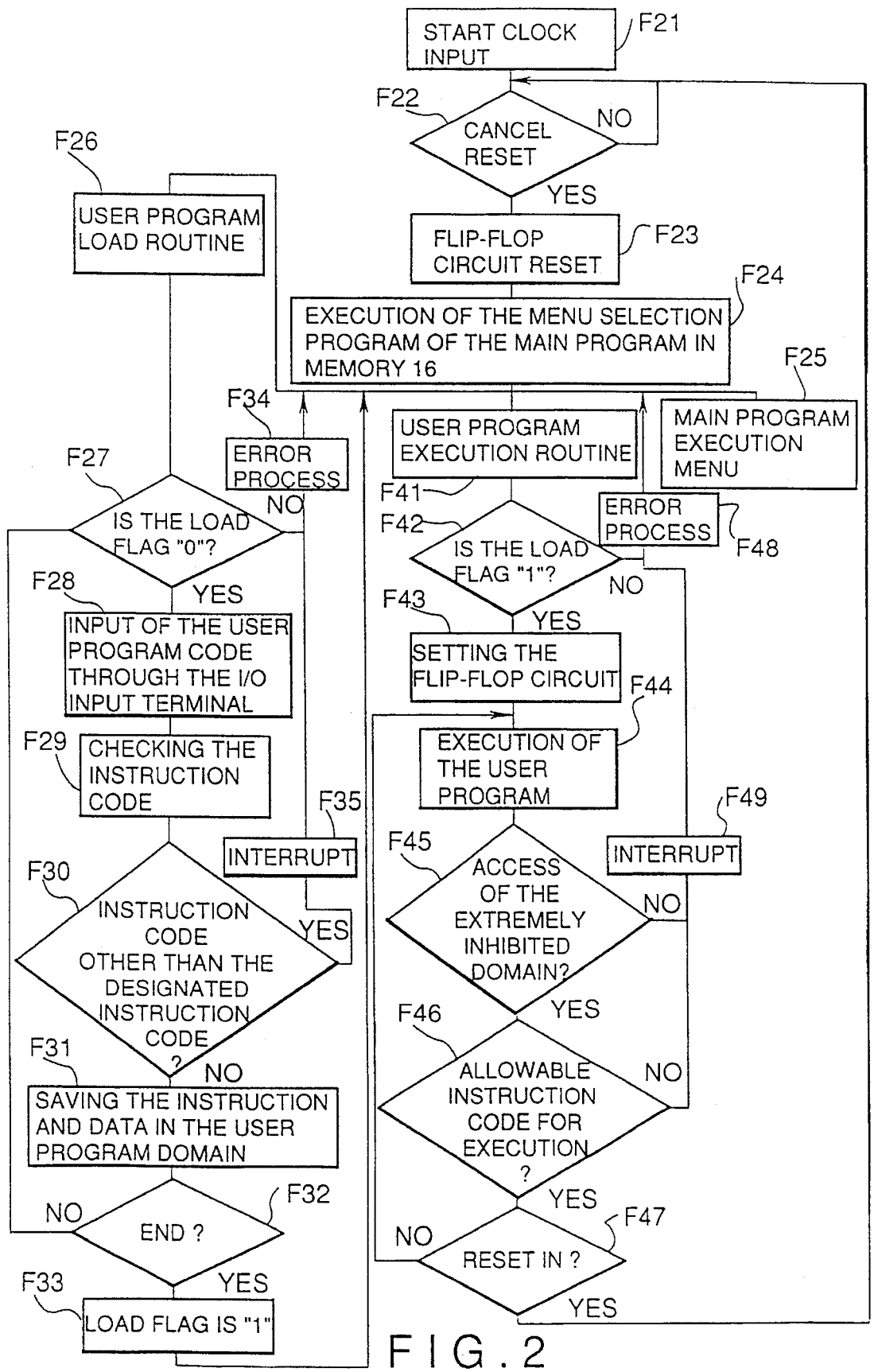
FIG. 2 is a flow chart describing the function of an embodiment of this invention.
Figure 3:
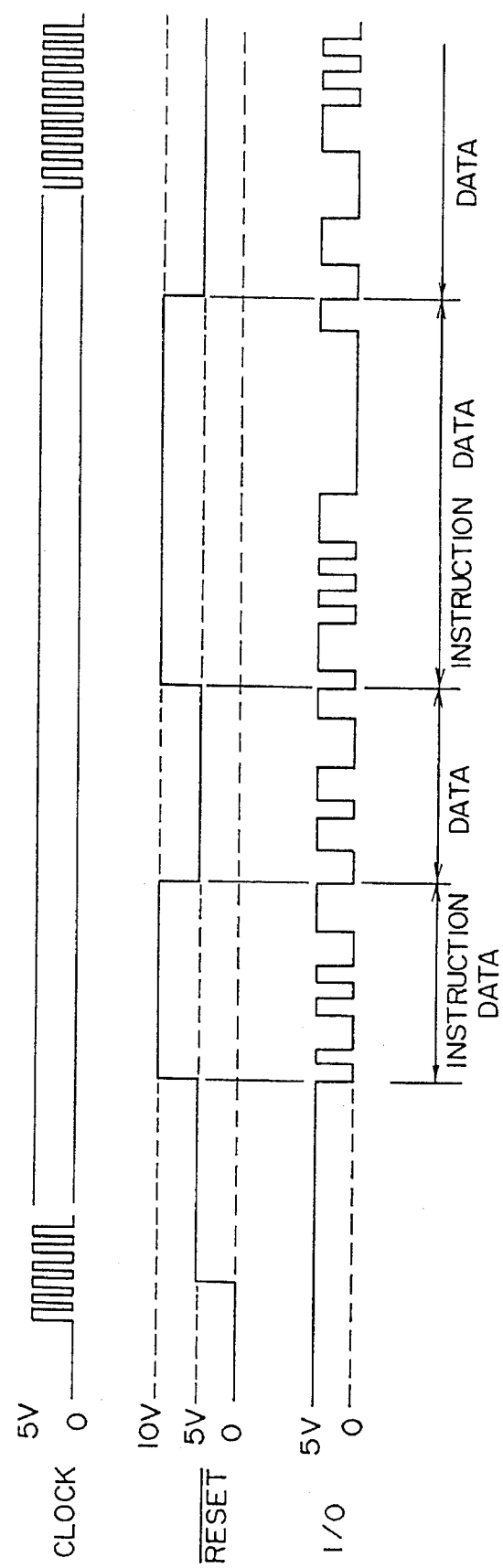
Figure 4:
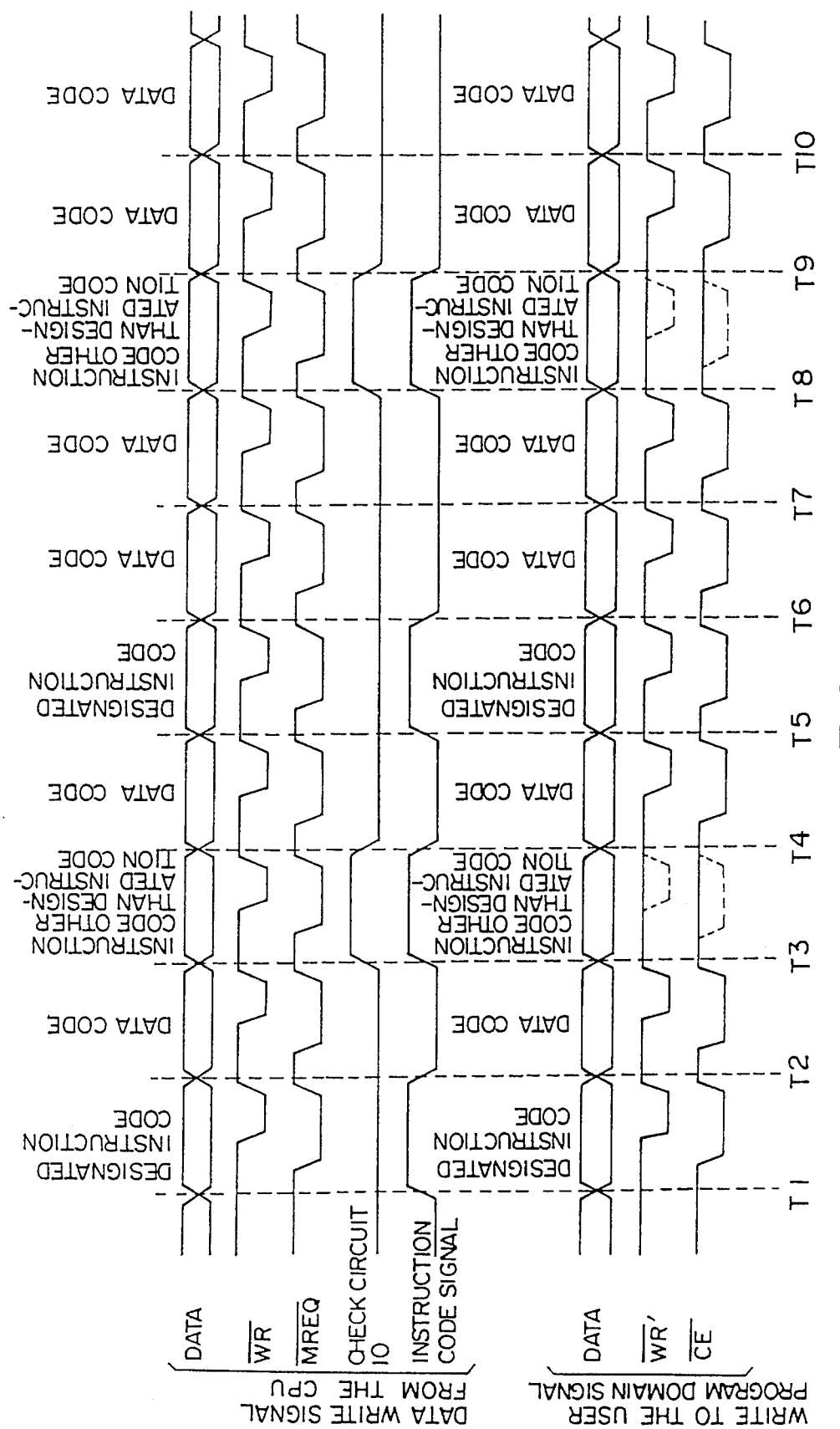
Figure 5:
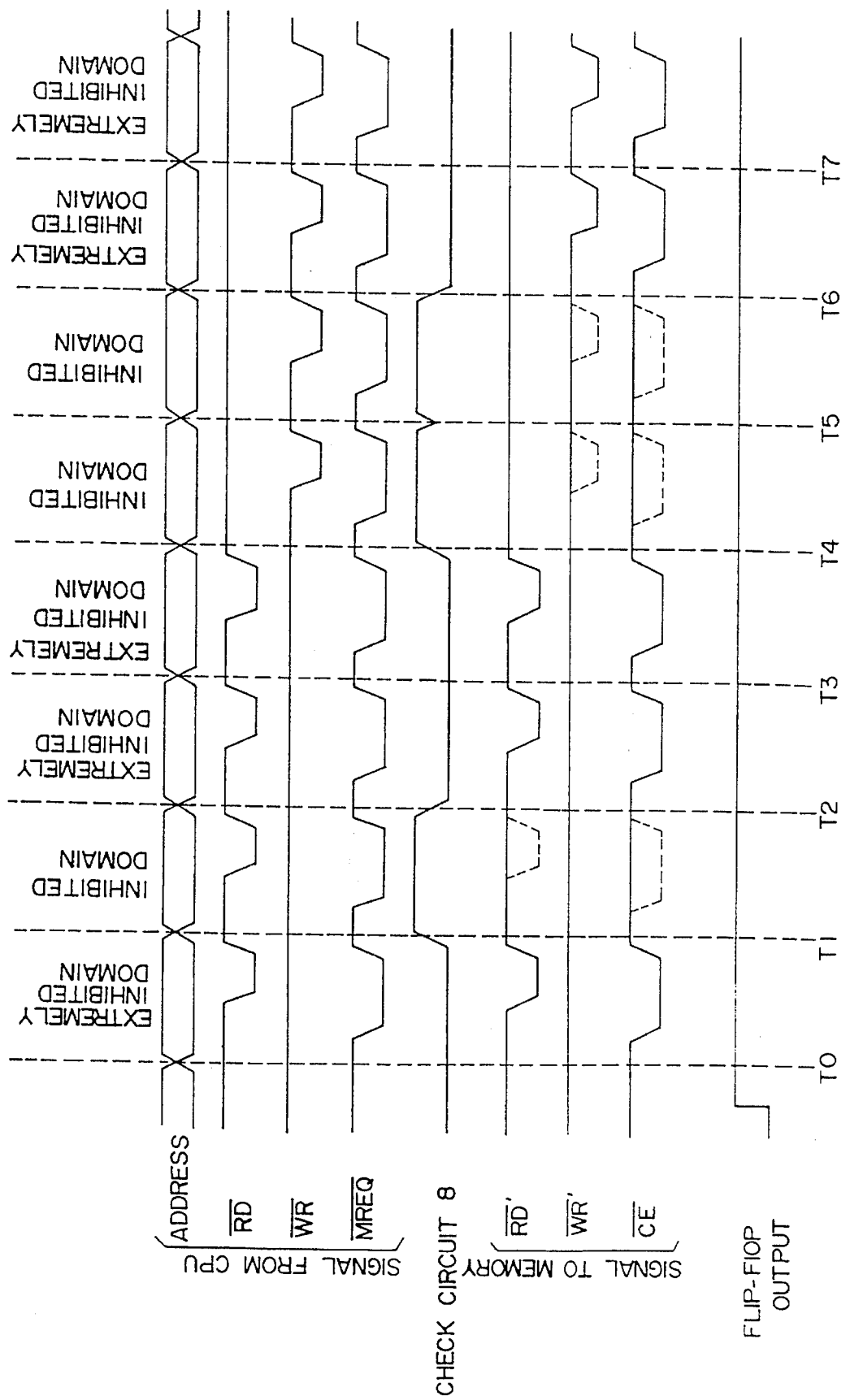

Next, when the user program execution routine is selected (see step F41 of FIG. 2) the CPU 6 checks to see whether the program load flag is set to "1" (see step F42 of FIG. 2). If the program load flag is not set to "1" an error process is executed (see step F48 of FIG. 2).

If the program load flag is set to "1" the value "1" is sent from the CPU 6 along the data bus L2 to the D terminal of the flip-flop circuit 11 and the specific address signal is sent to the decoder circuit 7 along the address bus L1. When this happens, the decoder circuit 7 produces a trigger signal and triggers the flip-flop circuit 11 and output Q of the flip-flop circuit 11, or in other words, the user program execution flag is set to "1" (see F43 of FIG. 2). By setting the user program execution flag to "1" the check circuits 8 and 10 operate and the user program is executed (see step F44 of FIG. 2). If the CPU 6 attempts to access the inhibited access region of the memory 16 during execution of the user program, an access denied signal is sent from the check circuit 8 to the NOR circuit 12 and the inhibit circuit 14 and control signals $\overline{RD}'$, $\overline{WR}'$ and $\overline{CE}$ for reading from and writing to the memory 16 are disabled. An interrupt command signal is sent to the CPU 6 and an interrupt process is executed (see steps F45, F49 and F48 of FIG. 2 and see FIG. 5).

Also during execution of the user program the instruction data is checked by the check circuit 10 as to whether it is instruction code other than that allowable for execution (see step F46 of FIG. 2) and if it is instruction code other than the allowable instruction code, for example instruction code to access the inhibited access region of the memory 16, an inhibit signal is sent to the inhibit circuit 14 from the check circuit 10 and memory control signals $\overline{RD}'$, $\overline{WR}'$ and $\overline{CE}$ are disabled and a meaningless instruction code such as NOP is sent to the CPU 6 from the check circuit 10 (see FIG. 6). At the same time, an interrupt signal is sent from the check circuit 10 to the CPU 6 by way of the NOR circuit 12 and an interrupt process occurs (see steps F49 and F48 of FIG. 2).

As was explained above, according to this embodiment, the instruction code used by the user program is automatically restricted by the check circuit 10 and access to the inhibited access region of the memory 16 is inhibited and damage, read out or alternation of the programs or data can be effectively prevented.

What is claimed is:

1. A microprocessor system including user programming limits for inhibiting access to a memory by checking specific addresses and codes, comprising:

a first memory which stores main programs and predetermined specific codes, said main programs and said predetermined specific codes being installed during manufacture of said microprocessor system, execution of said predetermined specific codes by users being prohibited;

a second memory which stores user programs written by users after manufacture of said microprocessor system;

a CPU which controls writing programs to said first and second memories and controls reading stored programs from said first and second memories;

check means connected between said CPU and said first and second memories, for checking whether said predetermined specific codes exist in a user program and inhibiting execution of said predetermined specific codes when said predetermined specific codes are detected during writing and reading of said user program controlled by said CPU, wherein said check means includes, a first check circuit that produces an access inhibit signal to inhibit access to said first memory when an access instruction supplied by said CPU designates a specific address where access by said users is prohibited;

a second check circuit that checks whether codes supplied by said CPU and said predetermined specific codes read out from said first memory are equal and generates a coincidence output signal; and an inhibit circuit which inhibits access to said first and second memories in response to said access inhibit signal from said first check circuit and said coincidence output signal from said second check circuit, and decode means for decoding an address signal supplied by said CPU to output a decoded signal, wherein an inhibit operation of said check means is triggered by said decoded signal of said specific address and includes means for producing a user program execution flag when said codes supplied by said CPU is one or more of said predetermined specific codes and operations of said first and second check circuits begin when said user program execution flag is produced.

2. A method for preventing unauthorized operations in a microprocessor system provided for inhibiting access to a memory by checking specific addresses and codes, comprising the steps of:

storing main programs and predetermined specific codes in a first memory, said main programs and said predetermined specific codes being installed during manufacture of said microprocessor system, execution of said predetermined specific codes by a user being prohibited;

storing user programs in a second memory;

respectively writing and reading said main and user programs to and from said first and second memories with a CPU;

receiving address information over an address bus into a first check circuit, connected between said CPU and said first and second memories;

activating a first check signal in said first check circuit to inhibit access to said first memory when an access instruction to a predetermined prohibited address is supplied by said CPU;

receiving data information including an instruction code over a data bus into a second check circuit, connected between said CPU and said first and second memories;

activating a second check signal in said second check circuit when instruction code of said user program matches one of said predetermined specific codes;

receiving said first and second check signals into an inhibit circuit;

inhibiting access to said first and second memories according to said first and second check signals;

decoding an address signal supplied by said CPU to output a decoded signal, wherein the inhibiting access step is triggered by said decoded signal of said specific address; and producing a user program execution flag when said data information is one or more of said predetermined specific codes, wherein operations of said first and second check circuits begin when said user program execution flag is produced.

3. A method according to claim 2, further comprising the steps of:

receiving instruction codes and data codes through an input/output terminal;

inputting a reset signal into a reset terminal, said reset signal being at a first voltage during loading of said instruction codes, a second voltage during loading of said data codes and a third voltage to indicate an active reset;

comparing said reset signal and a reference voltage in a voltage comparator circuit;

outputting a comparison result from said voltage comparator circuit indicating when data codes and instruction codes are being loaded according to the comparison result of said reference voltage and said reset signal.

* * * * *